US011188507B2

(12) United States Patent
Jaiswal et al.

(10) Patent No.: US 11,188,507 B2
(45) Date of Patent: Nov. 30, 2021

(54) AUTOMATICALLY SETTING AN AUTO-PURGE VALUE TO MULTIPLE TABLES WITHIN A DATABASE

(71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US); Burt L. Vialpando, Irving, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 16/654,427

(22) Filed: Oct. 16, 2019

(65) Prior Publication Data
US 2020/0050593 A1 Feb. 13, 2020

Related U.S. Application Data

(63) Continuation of application No. 15/258,424, filed on Sep. 7, 2016, now abandoned.

(51) Int. Cl.
G06F 16/00 (2019.01)
G06F 16/215 (2019.01)
G06F 16/23 (2019.01)

(52) U.S. Cl.
CPC ............ *G06F 16/215* (2019.01); *G06F 16/23* (2019.01)

(58) Field of Classification Search
CPC .. G06F 16/215; G06F 16/2282; G06F 16/235; G06F 16/51; G06F 11/1471;
(Continued)

(56) References Cited

U.S. PATENT DOCUMENTS 6,915,314 B2  7/2005  Jackson et al.
7,188,116 B2  3/2007  Cheng
(Continued)

FOREIGN PATENT DOCUMENTS

WO    2015187193 A1    12/2015

OTHER PUBLICATIONS

Office Action dated Jul. 10, 2020 in related U.S. Appl. No. 15/826,930, 5 pages.
(Continued)

*Primary Examiner* — Shyue Jiunn Hwa
(74) *Attorney, Agent, or Firm* — Aaron Pontikos; Andrew D. Wright; Roberts Calderon Safran & Cole, P.C.

(57) ABSTRACT

A computer-implemented method includes: receiving, by a computing device, a database-level auto_purge value for a database having a plurality of tables, wherein the database-level auto_purge value represents a value associated with the entire database for when data is set to be purged or deleted from the plurality of tables in the database; setting, by the computing device, the database-level auto_purge value for the database; setting, by the computing device, table-level auto_purge values for the plurality of tables included in the database based on the database-level auto_purge value; and automatically purging data in the plurality of tables based on the table-level auto_purge values.

18 Claims, 12 Drawing Sheets

(58) Field of Classification Search
CPC ............. G06F 11/1662; G06F 11/2066; G06F
11/2069; G06F 11/2074; G06F 11/2082;
G06F 11/2089; G06F 11/2094; G06F
11/2097; G06F 16/9574; G06F 2201/855;
G06F 16/22; G06F 16/2379; G06F
16/254; G06F 16/258; G06F 16/113;
G06F 16/21; G06F 16/27; G06F 16/284;
G06F 11/1451; G06F 16/125; G06F
16/162; G06F 16/185; G06F 16/214;
G06F 16/2455; G06F 16/24556; G06F
16/24565; G06F 16/2477; G06F 16/25;
G06F 16/29; G06F 21/577; G06F 21/604;
G06F 21/6227; G06F 3/0605; G06F
3/0622; G06F 3/0652; G06F 3/0662;
G06F 3/067
See application file for complete search history.

(56) References Cited

U.S. PATENT DOCUMENTS

| | | | |
|---|---|---|---|
| 7,302,455 | B1 | 11/2007 | Cordsmeyer et al. |
| 7,890,509 | B1 | 2/2011 | Pearcy et al. |
| 8,484,172 | B2 | 7/2013 | Saake et al. |
| 8,938,414 | B1 | 1/2015 | Kolsenikov |
| 8,943,027 | B1 | 1/2015 | Dwan et al. |
| 9,037,534 | B1 | 5/2015 | Kolsenikov |
| 9,043,278 | B1 | 5/2015 | Wilson et al. |
| 9,201,610 | B2 * | 12/2015 | Wofford, IV ............ G06F 16/25 |
| 9,218,371 | B2 * | 12/2015 | Jaiswal ................. G06F 16/235 |
| 9,251,485 | B2 | 2/2016 | Kolsenikov |
| 9,904,696 | B2 * | 2/2018 | Jaiswal ................. G06F 16/215 |
| 9,964,696 | B2 | 5/2018 | Kim et al. |
| 10,909,096 | B2 * | 2/2021 | Jaiswal ................. G06F 16/215 |
| 2002/0095408 | A1 | 7/2002 | Cheng |
| 2003/0204420 | A1 * | 10/2003 | Wilkes ................... G16H 10/60 705/3 |
| 2005/0071320 | A1 | 3/2005 | Chkodrov et al. |
| 2007/0038631 | A1 | 2/2007 | Hiraga et al. |
| 2007/0180490 | A1 | 8/2007 | Renzi et al. |
| 2007/0294308 | A1 | 12/2007 | Megerian |
| 2009/0274384 | A1 * | 11/2009 | Jakobovits ............. G16H 30/20 382/254 |
| 2012/0136904 | A1 | 5/2012 | Venkata |
| 2013/0226882 | A1 | 8/2013 | Jaiswal et al. |
| 2014/0351201 | A1 * | 11/2014 | Hobart ................. G06F 16/125 707/603 |
| 2015/0356494 | A1 | 12/2015 | Kolesnikov |
| 2016/0048541 | A1 | 2/2016 | Jaiswal et al. |
| 2018/0067972 | A1 | 3/2018 | Jaiswal et al. |
| 2018/0081916 | A1 | 3/2018 | Jaiswal et al. |

OTHER PUBLICATIONS

Notice of Allowance dated Sep. 30, 2020 in related U.S. Appl. No. 15/826,930, 5 pages.
Office Action dated Apr. 2, 2020 in related U.S. Appl. No. 15/826,930, 13 pages.
"List of IBM Patents or Patent Applications Treated as Related", dated Oct. 11, 2019, 1 page.
Oracle, Oracle Database Secure Files and Large Objects Developer's Guide (Create_Table_Ret_Col), Nov. 18, 2011.
Mell et al., "The NIST Definition of Cloud Computing", NIST, Special Publication 800-145, Sep. 2011, 7 pages.
Radford University, ITEC 340 SQL #4 DML(insert, delete, update), http://www.radford.edu/~cshing/340/lectures/sql4.html, Radford university, Jan. 1, 1981, 3 pages.

* cited by examiner

| Table 1 Auto_purge value = 90 |||| 
|---|---|---|---|
| Row | Data | Update_date | Auto_purge_date (update_date + auto_purge value) |
| 1 | AA | 7/28/2016 | 10/26/2016 |
| 2 | AB | 7/28/2016 | 10/26/2016 |
| 3 | AC | 7/28/2016 | 10/26/2016 |
| 4 | AD | 7/28/2016 | 10/26/2016 |
| 5 | AE | 7/28/2016 | 10/26/2016 |
| 6 | AF | 7/28/2016 | 10/26/2016 |
| ⋮ | ⋮ | ⋮ | ⋮ |
| Table N Auto_purge value = 90 |||| 
| Row | Data | Update_date | Auto_purge_date (update_date + auto_purge value) |
| 1 | XX | 7/28/2016 | 10/26/2016 |
| 2 | XY | 7/28/2016 | 10/26/2016 |
| 3 | XZ | 7/28/2016 | 10/26/2016 |
| 4 | XA | 7/28/2016 | 10/26/2016 |
| 5 | XB | 7/28/2016 | 10/26/2016 |
| 6 | XC | 7/28/2016 | 10/26/2016 |

FIG. 7

Update to data triggers automatic update to update_date value and auto_purge_date value →

| Table 1 Auto_purge value = 90 |||| 
|---|---|---|---|
| Row | Data | Update_date | Auto_purge_date (update_date + auto_purge value) |
| 1 | AA1 | 7/29/2016 | 10/27/2016 |
| 2 | AB | 7/28/2016 | 10/26/2016 |
| 3 | AC | 7/28/2016 | 10/26/2016 |
| 4 | AD | 7/28/2016 | 10/26/2016 |
| 5 | AE | 7/28/2016 | 10/26/2016 |
| 6 | AF | 7/28/2016 | 10/26/2016 |

FIG. 8

| Table N+1 (Newly Added Table) Auto_Purge Value = 90 | | | |
| --- | --- | --- | --- |
| Row | Data | Update_date | Auto_purge_date (update_date + auto_purge value) |
| 1 | XX | 7/29/2016 | 10/27/2016 |
| 2 | XY | 7/29/2016 | 10/27/2016 |
| 3 | XZ | 7/29/2016 | 10/27/2016 |
| 4 | XA | 7/29/2016 | 10/27/2016 |
| 5 | XB | 7/29/2016 | 10/27/2016 |
| 6 | XC | 7/29/2016 | 10/27/2016 |

FIG. 9

AUTOMATICALLY SETTING AN AUTO-PURGE VALUE TO MULTIPLE TABLES WITHIN A DATABASE

BACKGROUND

The present invention generally relates to database purging and, more particularly, to automatically setting an auto-purge value to multiple tables within a database using based on a single user instruction.

Relational databases usually grow in size until an administrator (e.g., a database administrator (DBA)) or an application programmer proactively deletes data from the databases. Rarely do relational databases maintain or reduce in size organically. Thus manual administrator intervention is often required to control the size of the database. Manual administrator intervention can be especially costly, particularly in a cloud environment where a database may have been created (e.g., to prove a concept using data), where the database remained in the cloud only to keep growing and adding to cloud storage costs.

SUMMARY

In an aspect of the invention, a computer-implemented method includes: receiving, by a computing device, a database-level auto_purge value for a database having a plurality of tables, wherein the database-level auto_purge value represents a value associated with the entire database for when data is set to be purged or deleted from the plurality of tables in the database; setting, by the computing device, the database-level auto_purge value for the database; setting, by the computing device, table-level auto_purge values for the plurality of tables included in the database based on the database-level auto_purge value; and automatically purging data in the plurality of tables based on the table-level auto_purge values.

In an aspect of the invention, there is a computer program product for setting table-level auto_purge values for a plurality of tables with a single user instruction. The computer program product includes a computer readable storage medium having program instructions embodied therewith, the program instructions executable by a computing device to cause the computing device to: receive a database-level auto_purge value for a database having a plurality of tables, wherein the database-level auto_purge value represents a value associated with the entire database for when data is set to be purged or deleted from the plurality of tables in the database; set the database-level auto_purge value for the database; set table-level auto_purge values for the plurality of tables associated with the database, wherein the table-level auto_purge values match the database-level auto_purge value or a predefined minimum database-level auto_purge value; and automatically purge data in the plurality of tables based on the table-level auto_purge values.

In an aspect of the invention, a system includes a CPU, a computer readable memory and a computer readable storage medium associated with a computing device; program instructions to receive a database-level auto_purge value for a database having a plurality of tables, wherein the database-level auto_purge value represents a value associated with the entire database for when data is set to be purged or deleted from the plurality of tables in the database; program instructions to set the database-level auto_purge value for the database; program instructions to set table-level auto_purge values for the plurality of tables associated with the database, wherein the table-level auto_purge values match the database-level auto_purge value or a predefined minimum database-level auto_purge value; program instructions to store and maintain respective update_date values for each data record stored in the plurality of tables, wherein the respective update_date values represent a date in which each data record was last modified; program instructions to automatically purge data records in the plurality of tables based on the table-level auto_purge values, a current date, and the respective update_date values. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 7 shows example tables stored by a database in accordance with aspects of the present invention.

FIG. 8 shows an example of monitoring the age of data stored by the table in accordance with aspects of the present invention.

FIG. 9 shows an example of automatically setting an auto_purge value and adding columns to a newly created table to reflect a database-level auto_purge value in accordance with aspects of the present invention.

DETAILED DESCRIPTION

Figure 1:
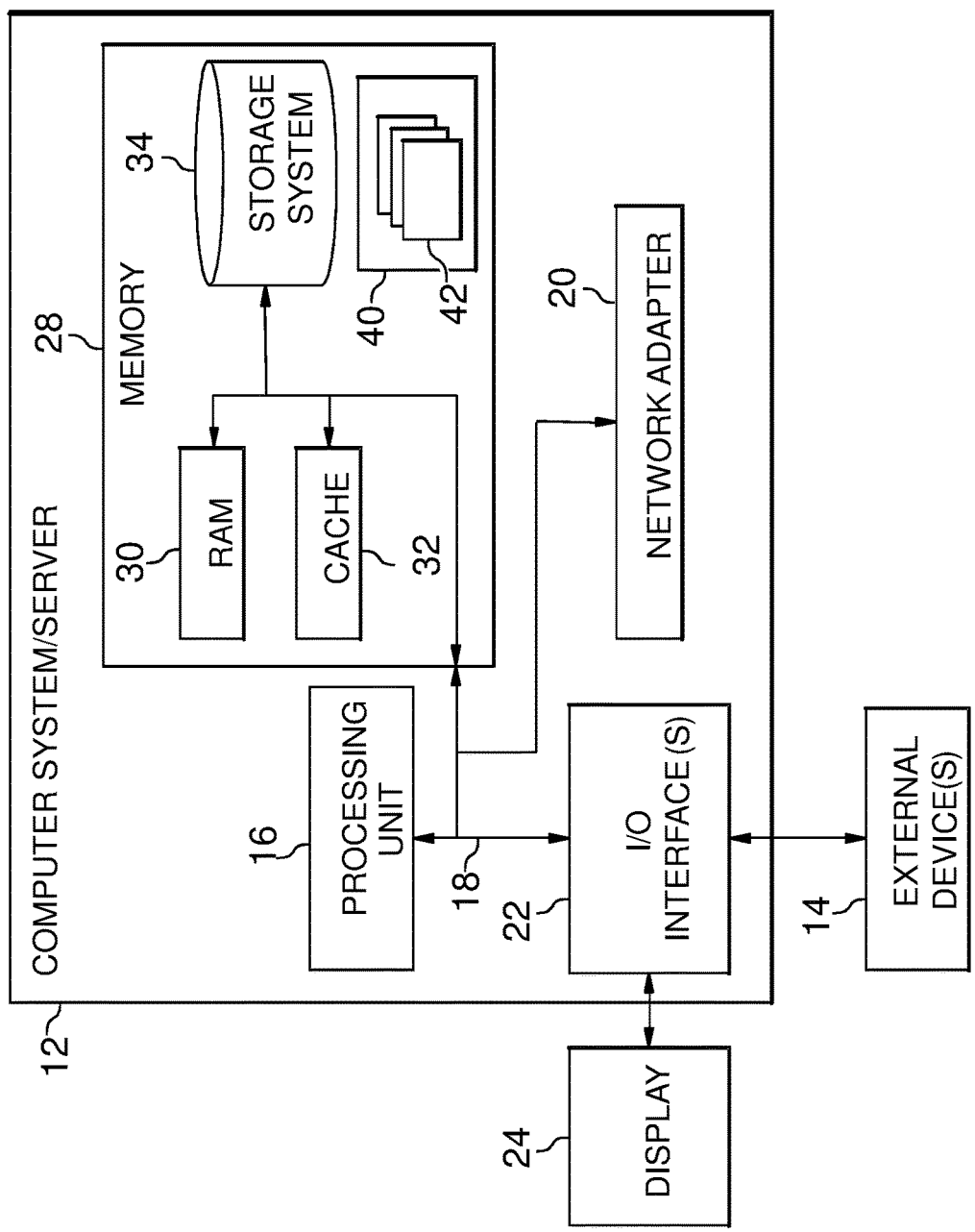
FIG. 1 depicts a cloud computing node according to an embodiment of the present invention.

The present invention generally relates to database purging and, more particularly, to automatically setting an auto-purge value to multiple tables within a database based on a single user instruction. As described herein, the auto-purge values define a threshold time period (e.g., in days) for when data within a table should be purged (e.g., deleted). For example, an auto-purge value of 90 would cause data stored within a table (e.g., stored within a particular cell or row of the table) to be deleted once the data is 90 days old.

As described herein, auto-purge values may be set for multiple tables within a database using a single user instruction. Once the auto-purge values are set, data from within each table in the database may be automatically purged (e.g., deleted) based on the age of the data, thereby controlling the size of the tables and thus the size of the entire database. Accordingly, aspects of the present invention eliminate the need for an administrator to manually set auto-purge values for each table within the database. For example, the administrator may set the auto-purge value one time (e.g., using a single command line or single instruction within a database application itself) in order to automatically set the auto-purge values for all existing tables and all future tables in a database. As a result, a substantial amount of time and costs are saved for controlling the size of databases, particularly for databases (e.g., in cloud environments) in which a single database may include dozens, hundreds, or even thousands of tables.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a hard drive). Although not shown, a magnetic disk drive for reading from and writing to a removable, non-volatile magnetic disk (e.g., a floppy disk), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
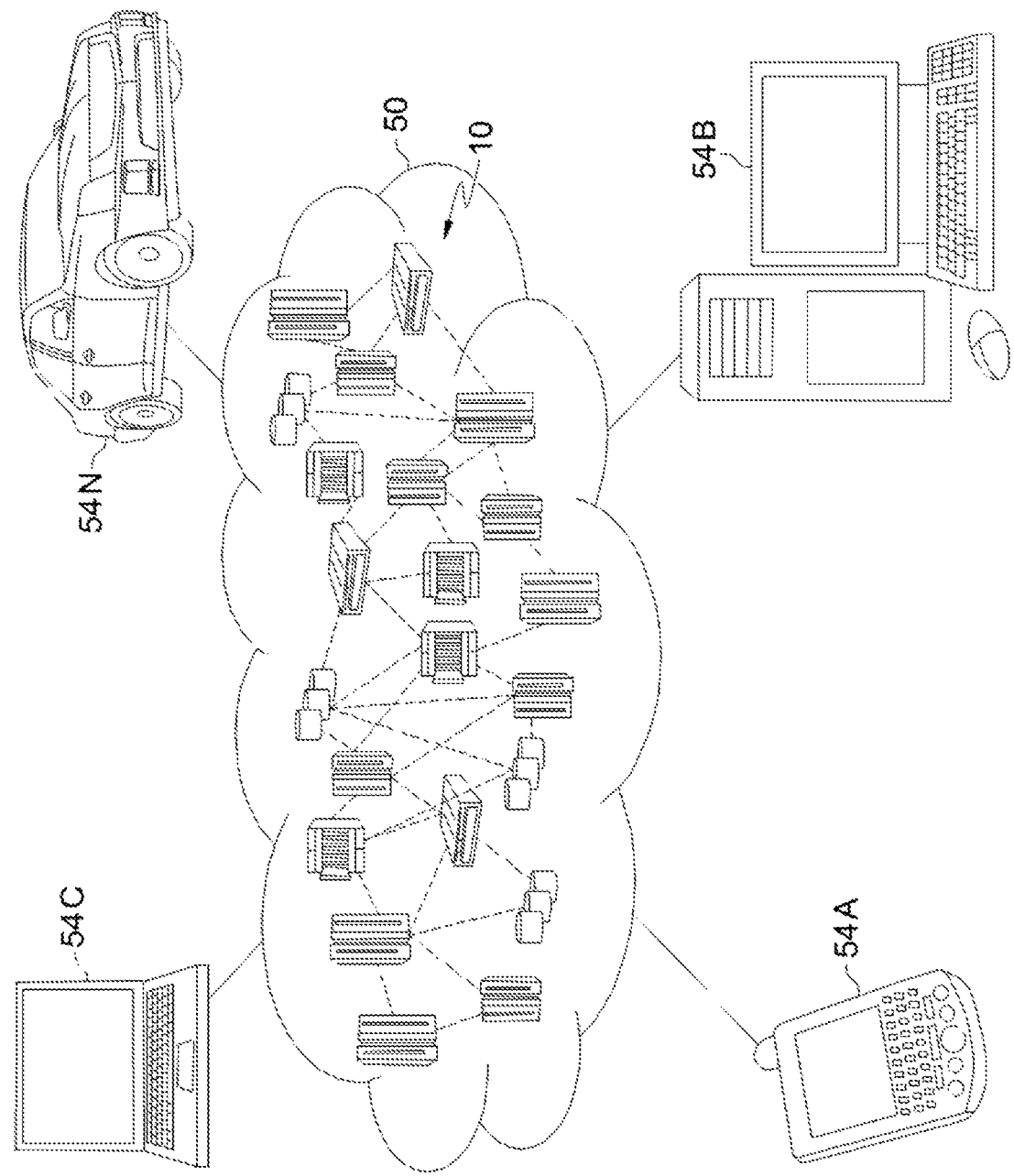
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
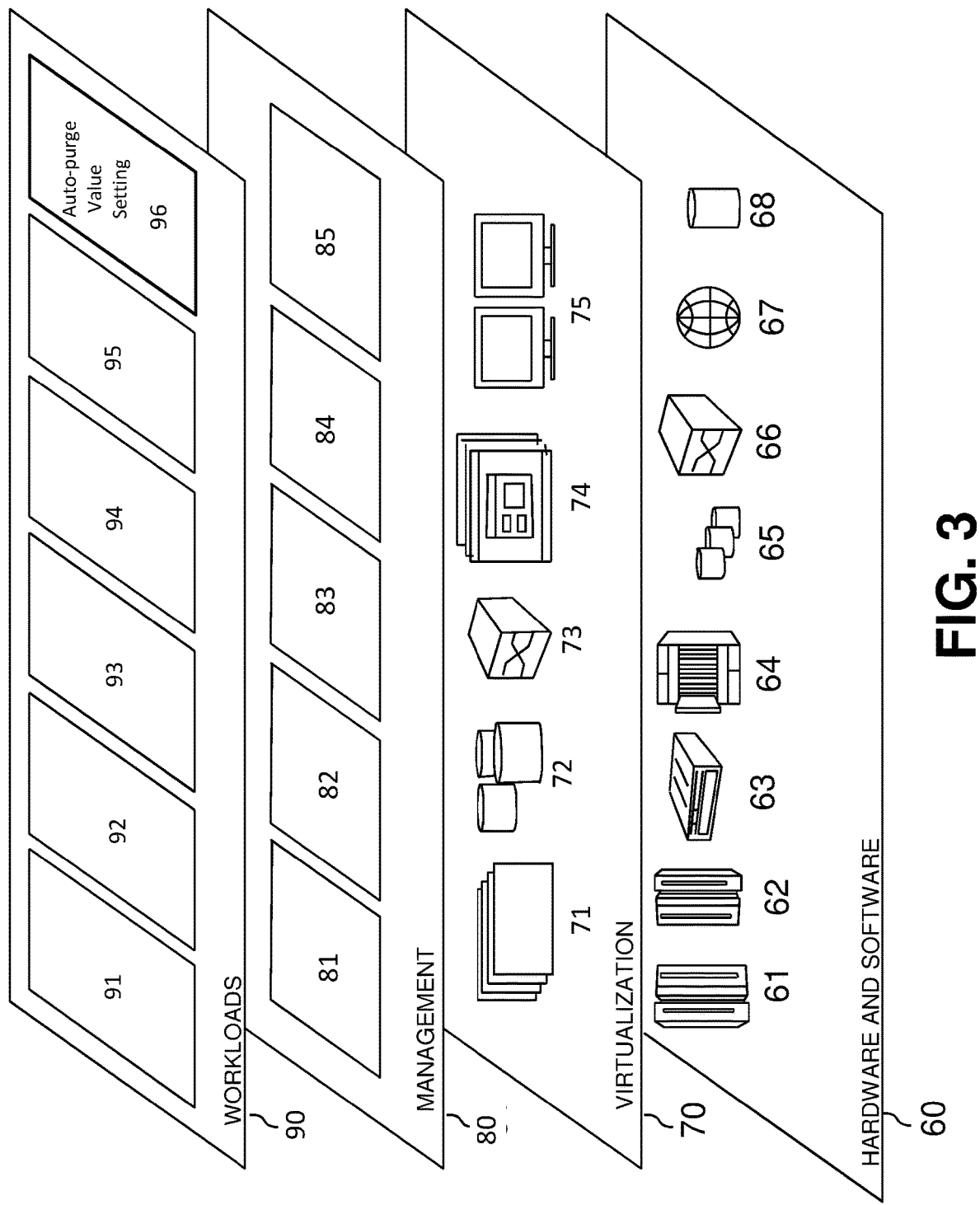
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and auto-purge value setting 96.

Referring back to FIG. 1, the program/utility 40 may include one or more program modules 42 that generally carry out the functions and/or methodologies of embodiments of the invention as described herein (e.g., such as the functionality provided by auto-purge value setting 96). Specifically, the program modules 42 may receive a database level auto_purge value from an administrator, set the auto_purge value for all tables within the database, and maintain an auto_purge_date value for each table. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a database server as shown in FIG. 4.

Figure 4:
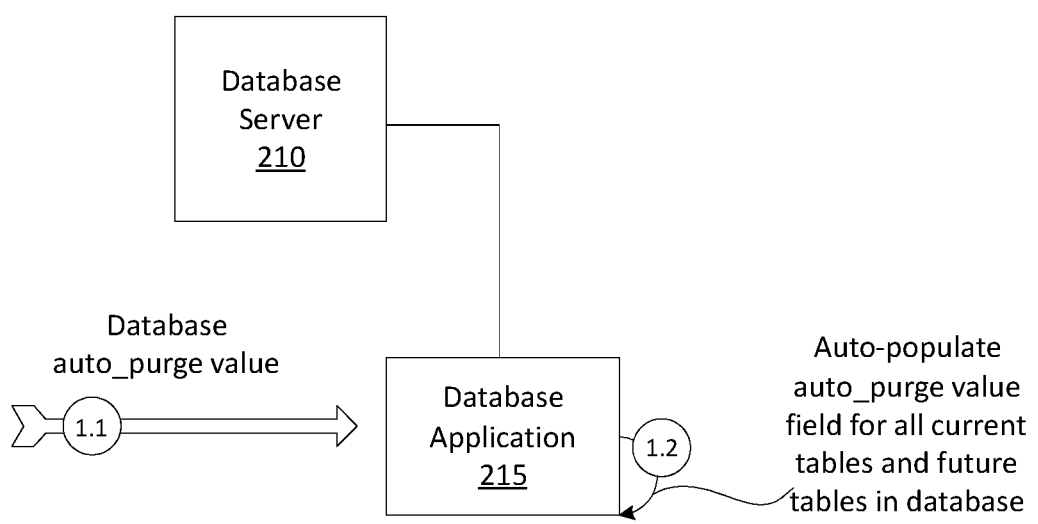
FIG. 4 shows an overview of an example implementation in accordance with aspects of the present invention

FIG. 4 shows an overview of an example implementation in accordance with aspects of the present invention. As shown in FIG. 4, the database server 210 may implement the database application 215 (e.g., an application that is used to create, maintain, and host databases). At step 1.1, the database application 215 may receive a database auto_purge value (e.g., from an administrator). For example, the database application 215 may receive the auto_purge value via command line, terminal window, user interface, or the like. The auto_purge value may be provided as a single user/administrator instruction. Based on receiving the auto_purge value, at step 1.2, the database application 215 may automatically populate an auto_purge value field for all current tables existing within the database. Further, the database application 215 may automatically populate an auto_purge value field for all future tables (e.g., tables created within the database at a later time).

As described herein, the auto_purge value for a table defines a threshold time period for when data within the table should be purged (e.g., deleted). For example, an auto-purge value of 90 would cause data stored within a table (e.g., stored within a particular cell or row of the table) to be deleted once the data is 90 days old. As described herein, the database application 215 may monitor the age of data stored by the tables within the database, and may automatically purge data when the data expires passed the auto_purge value. Accordingly, a substantial amount of time is saved as only a single user command is required to set the auto_purge value for multiple tables within the database. Thus, database size is easily controlled as data from all tables within the database will be purged based on the auto_purge value.

Figure 5:
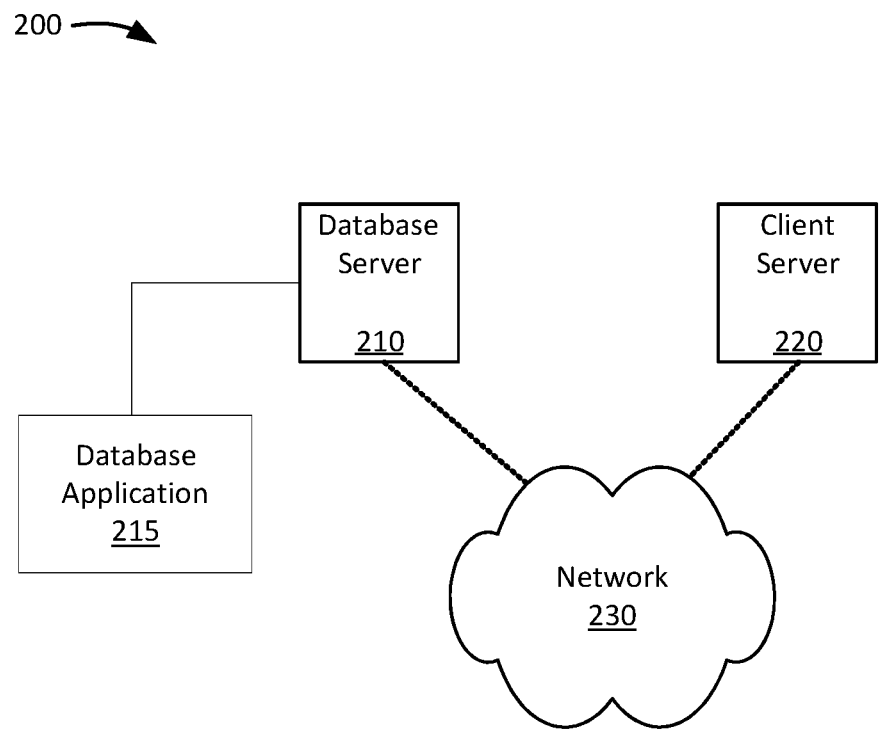
FIG. 5 shows an example environment in accordance with aspects of the present invention.

FIG. 5 shows an example environment in accordance with aspects of the present invention. As shown in FIG. 5, environment 200 may include the database server 210, client server 220, and network 230. In embodiments, one or more components in environment 200 may correspond to one or more components in the cloud computing environment of FIG. 2.

The database server 210 may include one or more computing devices, such as server devices, that implement the database application 215. In embodiments, the database server 210 may include one or more of the components of the computer system/server 12 of FIG. 1. The database server 210 may host one or more databases via the database application 215. The database application 215 may maintain the one or more databases and, more particularly, may set auto_purge values for multiple tables within a database (e.g., based on a database-level auto_purge value received via a single user instruction). Further, the database application 215 may automatically purge data based on the age of the data and the auto_purge value. As described herein, the processes of the present invention may be performed by and integrated within the database application 215.

The client server 220 may include one or more computing devices, such as server devices, that may provide and/or access data stored by a database hosted by the database server 210. The client server 220 may be associated with any number and any type of client that requires access to databases hosted by the database server 210. In embodiments, the client server 220 may update data stored by one or more databases hosted by the database server 210, and the database application 215 may monitor these updates while deleting data that has not been updated for a threshold period of time corresponding to the auto_purge value.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 5. In practice, the environment 200 may include additional devices and/or networks; fewer devices and/or networks; different devices and/or networks; or differently arranged devices and/or networks than illustrated in FIG. 5. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 6:
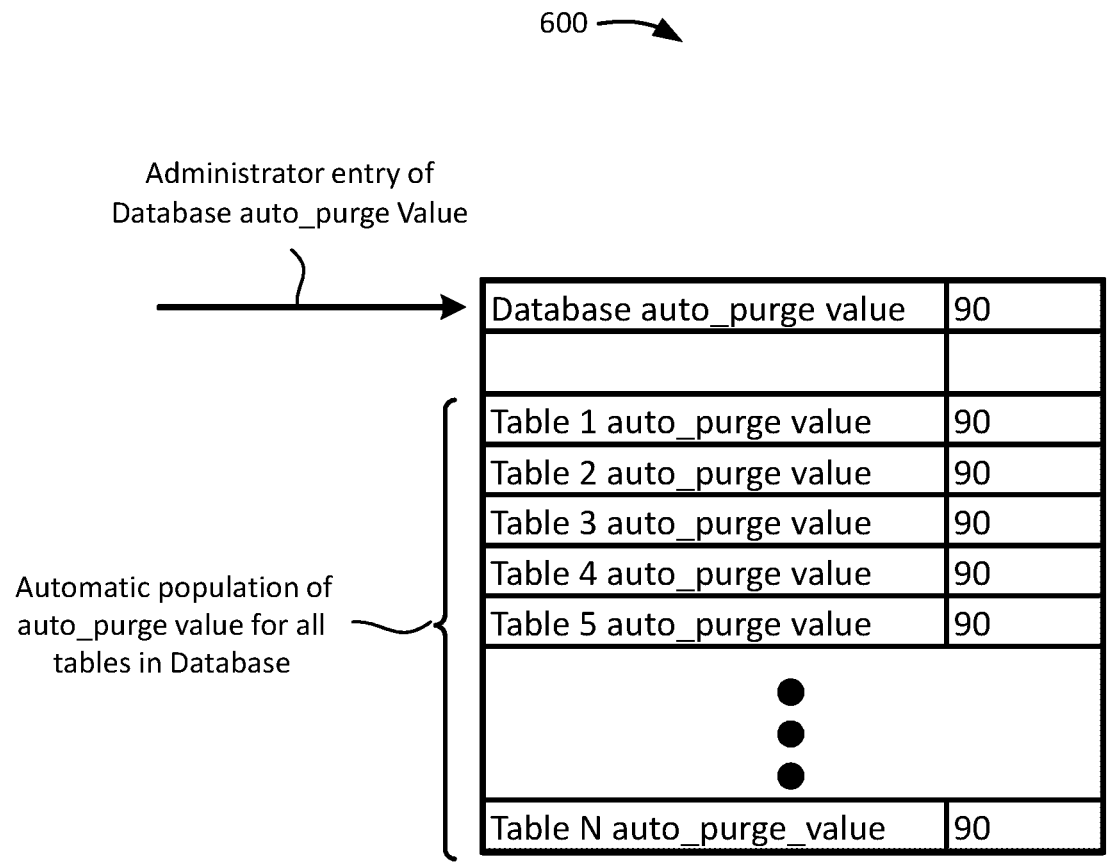
FIG. 6 shows an example data structure that stores auto_purge values for multiple tables within a database.

FIG. 6 shows an example data structure that stores auto_purge values for multiple tables within a database. Data structure 600 may be stored by the database server 210 and/or the database application 215. As shown in FIG. 6, data structure 600 may store a database auto_purge value. The database auto_purge value may be received by an administrator (e.g., via a command line, user interface, terminal window, or the like). The database auto_purge value may be received as a single user instruction or input. In the example of FIG. 6, an auto_purge value of 90 (e.g., 90 days) is received and stored.

As further shown in FIG. 6, data structure 600 may store auto_purge values for each existing table in the database. For example, data structure 600 may store auto_purge values for tables 1 through N (where N is an integer greater than or equal to 1). As shown in FIG. 6, the auto_purge values for each table may be automatically populated in data structure 600 (e.g., based on the one-time entry of the database auto_purge value by the administrator). For example, the auto_purge value for tables 1 through N may be automatically populated to match the database auto_purge value (e.g., 90 days). In this way, the auto_purge value is not required to be entered for each of tables 1 through N, thereby saving time when setting the auto_purge values at the database level. As described herein, auto_purge values for individual tables may be modified, however, by default, all the auto_purge values for each table may be set to the database auto_purge value.

FIG. 7 shows example tables stored by a database in accordance with aspects of the present invention. As shown in FIG. 7, tables 1 through N may store an auto_purge value of 90 (e.g., based on the database auto_purge value of 90 as described in FIG. 6). Each table may store data organized in rows. Each row may also include an update_date value and an auto_purge_date value. The update_date value may define a last modified date for the data in the row. As described herein, the update_date value for a row may be updated to a current date each time data in the row is updated. The auto_purge_date value may define a date in which the data in the row is set to be deleted. For example, the auto_purge_date value may correspond to the update_date value added with the auto_purge value. As described herein, the auto_purge_date value may be linked directly to the update_date value and the auto_purge value. In embodiments, the auto_purge_date values may not be stored and data may be deleted without the need to store the auto_purge_date values. For example, as described in greater detail herein, data may be deleted when only the update_date and the auto_purge values are stored. As an example, a data record (e.g., a row of data) may be purged during an auto-purge process when a current date matches or surpasses the update_date value plus the auto_purge value. That is, the update_date value may be referenced during auto-purging to identify data records to delete without the need to store the auto_date_purge values.

In accordance with aspects of the present invention, the update_date column may be initially created and its value set to a current date when the database auto_purge is initially received and when the update_date column does not currently exist. However, if the update_date column already exists and is currently storing values (e.g., if a database auto_purge value is being modified), the value of the update_date column may remain unchanged. Further, the auto_purge_date column may be initially created and its value set to a current date plus the auto_purge value when the database auto_purge is initially received and when the update_date column does not currently exist.

FIG. 8 shows an example of monitoring the age of data stored by the table in accordance with aspects of the present invention. As shown in FIG. 8, an update to data within a table (e.g., an update to data stored in row 1 of table 1), may trigger an automatic update to the update_date value and, in turn trigger an update to the auto_purge_date value. In this way, the auto_purge_date value may be updated based on the changes to the data (e.g., effectively resetting the time period for when the data is set to be purged or deleted).

FIG. 9 shows an example of automatically setting an auto_purge value and adding columns to a newly created table to reflect a database-level auto_purge value in accordance with aspects of the present invention. As shown in FIG. 9, an auto_purge value is automatically set for a newly created table in a database (e.g., table N+1) without requiring user input. For example, new tables in the database may include a field for the table-level auto_purge value with a link or reference to the database-level auto_purge value. Accordingly, when a new table is created, the database application 215 may refer to the stored database-level auto_purge value and populate the table-level auto_purge value for the newly created table to reflect the database-level auto_purge value. Additionally, or alternatively, the database application 215 may analyze the table-level auto_purge values for existing tables in the database, and set the auto_purge value for the newly created table as the same auto_purge values as the existing tables. If existing tables include different auto_purge values (e.g., in a situation in which the auto_purge values for a subset of the existing tables was changed), the database application 215 may set the auto_purge value for the new table as the same auto_purge values as a majority of the existing tables.

As further shown, an update_date column and an auto_purge_date column are automatically added to the newly created table. In embodiments, the update_date value may be set to a current date in which the table is created and data is initially stored in the table. In this way, an administrator does not need to remember to set the auto_purge value when creating a new database (e.g., using a CREATE TABLE command). In other words, the database-level auto_purge value may automatically apply a table-level auto_purge value for future tables created within the database.

Figure 10:
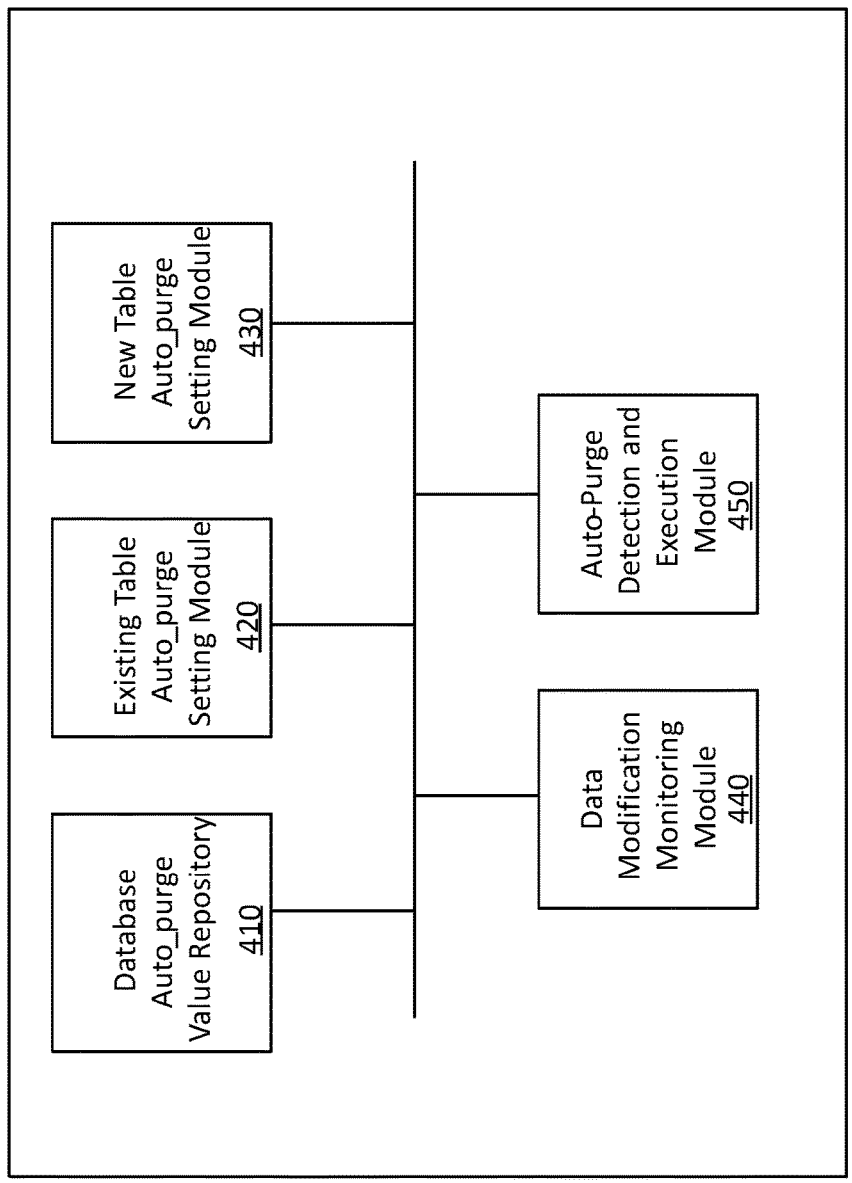
FIG. 10 shows a block diagram of example components of a database server in accordance with aspects of the present invention.

FIG. 10 shows a block diagram of example components of a database server 210 in accordance with aspects of the present invention. As shown in FIG. 10, the database server may include a database auto_purge value repository 410, an existing table auto_purge setting module 420, a new table auto_purge setting module 430, a data modification monitoring module 440, and an auto-purge detection and execution module 450. In embodiments, the database server 210 may include additional or fewer components than those shown in FIG. 10. In embodiments, separate components may be integrated into a single computing component or module. Additionally, or alternatively, a single component may be implemented as multiple computing components or modules.

The database auto_purge value repository 410 may include a data storage device (e.g., storage system 34 of FIG. 1) that stores a database-level auto_purge value. As described herein, the database-level auto_purge value may be received by the database server 210 from an administrator.

The existing table auto_purge setting module 420 may include a program module (program module 42 of FIG. 1) that sets the auto_purge value for existing tables in the database (e.g., in a similar manner as shown in FIG. 6). For example, as described above, the auto_purge setting module 420 may refer to the stored database-level auto_purge value (e.g., stored in database auto_purge value repository 410) and populate the table-level auto_purge value for the newly created table to reflect the database-level auto_purge value. Additionally, or alternatively, the auto_purge setting module 420 may analyze the table-level auto_purge values for existing tables in the database, and set the auto_purge value for the newly created table as the same auto_purge values as the existing tables. In embodiments, the existing table auto_purge setting module 420 may also create an update_date column and a auto_purge_date column and populate the columns as described above with respect to FIG. 7.

The new table auto_purge setting module 430 may include a program module (program module 42 of FIG. 1) that sets the auto_purge value for newly created tables in the database (e.g., tables that are created after the database-level auto_purge value is set. In embodiments, the new table auto_purge setting module 430 may also create an update_date column and an auto_purge_date column and populate the columns for newly created tables as described above with respect to FIG. 9.

The data modification monitoring module 440 may include a program module (program module 42 of FIG. 1) that monitors data stored within the tables of the database. For example, the data modification monitoring module 440 may monitor the data and detect when data has been added or modified to the tables. The data modification monitoring module 440 may update the update_date and auto_purge_date values as described above with respect to FIG. 8.

The auto-purge detection and execution module 450 may include a program module (program module 42 of FIG. 1) that detects when the age of data has surpassed the auto_purge value. More specifically, the auto-purge detection and execution module 450 may detect when the update_date value has surpassed the auto_purge_date value for data within a particular row or cell. Based on detecting that the update_date value has surpassed the auto_purge_date value, the auto-purge detection and execution module 450 may automatically purge or delete the data thereby controlling the size of the table and the database. In other words, the auto-purge detection and execution module 450 may compare a current date to the auto_purge_date value and may automatically purge data when the current date matches or surpasses the auto_purge_date value. In embodiments, the auto_purge_date column and value may not be stored in the tables. In this situation, the auto-purge detection and execution module 450 may purge the data when a current date matches or surpasses the update_date value plus the auto_purge value.

Figure 11:
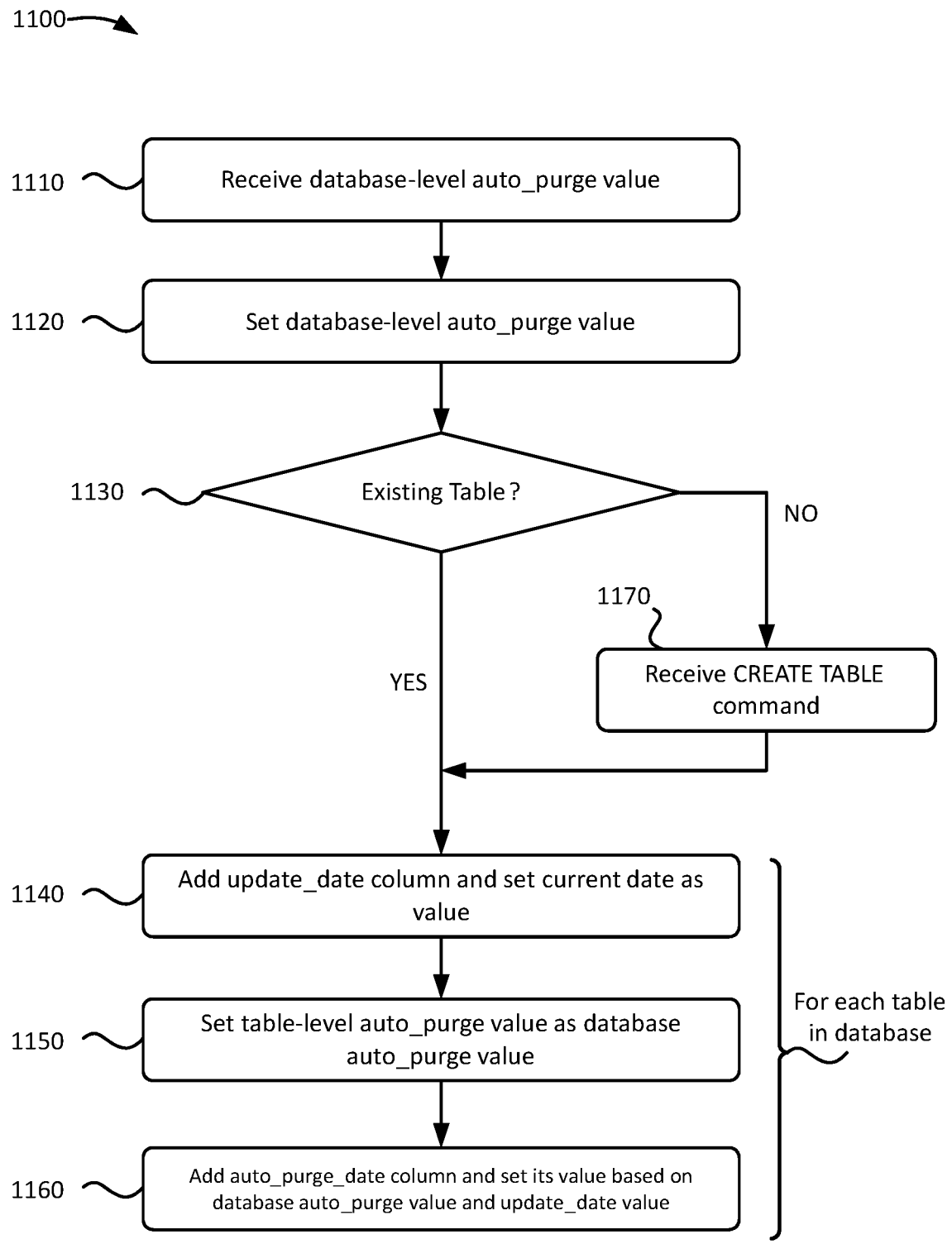
FIG. 11 shows an example flowchart for setting an auto_purge value for multiple tables within a database based on a single user instruction in accordance with aspects of the present invention.

FIG. 11 shows an example flowchart for setting an auto_purge value for multiple tables within a database based on a single user instruction in accordance with aspects of the present invention. The steps of FIG. 11 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 11, process 1100 may include receiving a database-level auto_purge value (step 1110). For example, the database application 215 may receive the database-level auto_purge value from an administrator (e.g., via a command line, terminal window, user interface, or the like).

Process 1100 may further include setting a database-level auto_purge value (step 1120). For example, the database application 215 may set the database-level auto_purge value (e.g., as described above with respect to FIG. 6). In embodiments, the database application 215 may implement security procedures and protocols prior to setting the database-level auto_purge value. For example, the database application 215 may authenticate the source from which the database-level auto_purge value is received (e.g., to verify that the database-level auto_purge value is received from an authorized administrator). Any database administrator authentication techniques or protocols may be used, such as the Database Administration Authority (DBADM). In embodiments, the database application 215 may implement a predefined minimum or default auto_purge value (e.g., such that data remains in the tables for at least a minimum or default amount of time). If the received database-level auto_purge value is less than the minimum or default value, the database application 215 may set the database-level auto_purge value as the minimum or default value. In embodiments, the predefined minimum or default auto_purge value may be modified by an administrator having a sufficient level of database management authority.

Process 1100 may also include determining whether tables exist in the database (step 1130). For example, the database application 215 may determine whether tables currently exist (e.g., based on whether the database auto_purge value is received as part of a new database set up or an existing database modification). If, for example, tables exist (step 1130—YES), process 1100 may include adding an update_date column and setting a current date as its value. In embodiments, step 1140 if an update_date column already exists (e.g., if the database auto_purge value is an updated value to an existing auto_purge value).

Process 1100 may also include setting the table-level auto_purge value as the database auto_purge value (step 1150). For example, the database application 215 may set the table-level auto_purge value as the database auto_purge value (e.g., as described above with respect to FIG. 6. Process 1100 may further include adding an auto_purge_date column and setting the its value based on the auto_purge value and update_date value. For example, the database application 215 may add the auto_purge_date column and setting its value based on the auto_purge value and update_date value (e.g., as described above with respect to FIG. 7). As shown in FIG. 11, steps 1140-1160 may be performed for each table in the database.

If, at step 1130, tables do not currently exist in the database, process 1100 may include receiving a CREATE TABLE command (step 1170). For example, the database application 215 may receive a CREATE TABLE command from an administrator to create a new table within the database. Process 1100 may proceed to steps 1140-1160 as described herein. Further steps 1140-1160 may be repeated each time a new table is created.

Figure 12:
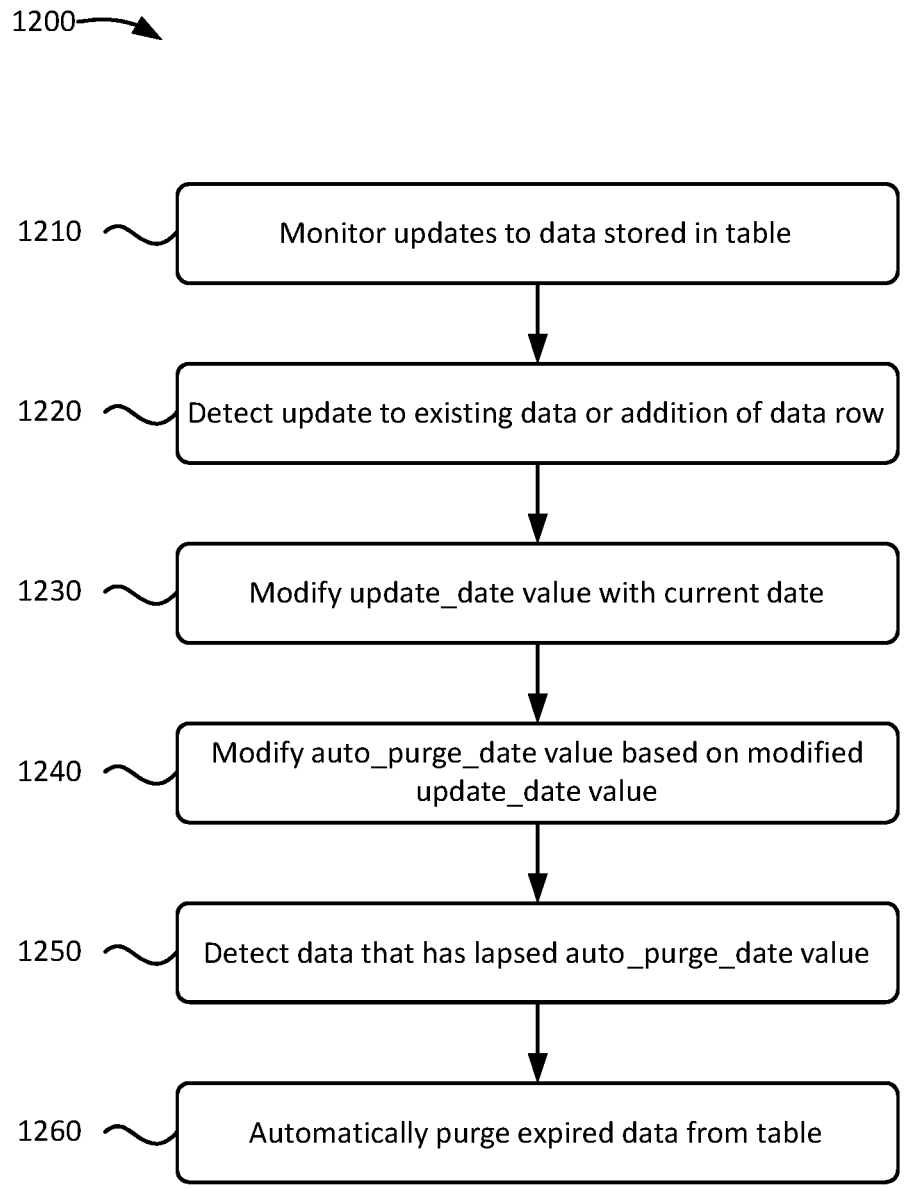
FIG. 12 shows an example process for automatically purging data from multiple tables in a database in accordance with aspects of the present invention.

FIG. 12 shows an example process for automatically purging data from multiple tables in a database in accordance with aspects of the present invention. The steps of FIG. 12 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 12, process 1200 may include monitoring updates to data stored in a table (step 1210). For example, the database application 215 may monitor updates to data stored in a table of the database (e.g., as described above with respect to the data modification monitoring module 440. Process 1200 may also include detecting updates to existing data or the addition of a data row (step 1220). For example, the database application 215 may detect updates to existing data or the addition of a data row (e.g., as described above with respect to the data modification monitoring module 440. In embodiments, updates to existing data and/or additional data may be received from the client server 220.

Process 1200 may also include modifying the update_date value with a current date (step 1230). For example, the database application 215 may modify the update_date value with a current date (e.g., for the data row in which data was modified or added, as described above with respect to FIG. 8). Process 1200 may also include modifying the auto_purge_date value based on the modified update_date value (step 1240). For example, the database application 215 may modify the auto_purge_date value based on the modified update_date value (e.g., as described above with respect to FIG. 8).

Process 1200 may further include detecting data that has lapsed the auto_purge_date value (step 1250). For example, the database application 215 may detect data that has lapsed (e.g., is expired) when the auto_purge_date value (e.g., when a current date surpasses the auto_purge_date value as described above with respect to the auto-purge detection and execution module 450). Alternatively, the database application 215 may determine the age of data records stored by the tables based on a current date and the update_date value (e.g., by subtracting the current date from the update_date value). The database application 215 may determine data records whose age is greater than or equal the auto_purge value (e.g. expired data records).

Process 1200 may also include automatically purging expired data from the table (step 1260). For example, the database application 215 may automatically purge expired data (e.g., data stored in rows having an auto_purge_date value that is of a current date or a passed date). In embodiments, an auto_purge_date column and value may not be stored in the table, and instead, the expired data may be purged when a current date reaches the update_date value plus the auto_purge value.

Process 1200 may be repeated for each table in the database. In this way, data is automatically purged in accordance with the auto_purge value for each table, which as discussed above, is set one time using a single user instruction for all tables in the database. Advantageously, significant amount of time is saved for setting or modifying an auto_purge value for all tables in a database.

In embodiments, the database application 215 may implement a setting to turn on or off an auto-purging or automatic table cleanup feature. Process 1200 may be performed when the setting is turned on (e.g., by an administrator). In embodiments, the setting may be turned off by default in order to avoid any inadvertent auto-purging. When turned on, the database application 215 may analyze each table in the database and will delete expired data records (e.g., data for which the update_date value is on or before the auto_purge_date value, or that have a difference of the update_date compared to the current system date greater than the auto_purge value).

In embodiments, auto-purging may be selectively disabled for specific tables in the database (e.g., by using a command to set the table-level auto_purge value to 0, null, or −1 for selected tables). In embodiments, tables in the database that are subject to auto-purging may be identified in a system catalog and/or data dictionary view or using a command (e.g., the command LIST AUTO PURGE TABLES). The output of this view or command may identify the table name and table-level auto_purge values. This will enable an administrator to quickly and easily check to ensure that no critical tables are set to auto-purge. An example of the output or view may correspond to the tables shown in FIG. 7.

If the database application 215 does not have an automatic table cleanup feature, a script may be used to perform the auto-purging and corresponding DELETE statement for each of tables having expired data. The script may be scheduled for execution one time a scheduling facility of the database application 215. If the database application 215 does not have a scheduling facility, a high-authority database administrator may schedule an initial DELETE or purge job one time as a last resort. In subsequent auto-purge instances, auto-purging may be completed without any further intervention or changes to the script, even if more tables are created or altered that use the automatic table cleanup feature.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, a database-level auto purge value for a database having a plurality of tables;
authenticating, by the computing device, a source from which the database-level auto purge value is received by implementing a database administrator authentication protocol;
setting, by the computing device, table-level auto purge values for the plurality of tables included in the database based on the database-level auto purge value;
automatically purging, by the computing device, data in a table of the plurality of tables based on determining the data in the table has an age that is equal to or greater than a threshold time period included in the database-level auto purge value; and adding a column and a corresponding update_date value to each row in the plurality of tables based on the table-level auto purge values, wherein:
the database administrator authentication protocol is a Database Administration Authority (DBADM) database administrator authentication protocol and includes a default auto purge value,
the default auto purge value indicates that the data remains in the plurality of tables for at least a default amount of time, and
the default auto purge value is set as a default value in response to the database-level auto purge value being less than the default auto purge value.

2. The computer-implemented method of claim 1, wherein the receiving the database-level auto_purge value comprises receiving a single user instruction, and the table-level auto_purge values are set for the plurality of tables included in the database based on only the single user instruction.

3. The computer-implemented method of claim 1, wherein the update_date value corresponds to a current date.

4. The computer-implemented method of claim 1, further comprising modifying the update_date value for a row in the plurality of tables when data in the row in the plurality of tables is modified.

5. The computer-implemented method of claim 1, further comprising adding a corresponding auto_purge_date value to each row in the plurality of tables based on setting the table-level auto_purge values,
wherein each of the auto_purge_date values corresponds to update_date values in addition to the table-level auto_purge values;
wherein the update_date value includes a last modified date for the automatically purged data in the row; and
wherein the automatically purged data is deleted without storing the auto_purge_date values.

6. The computer-implemented method of claim 1, further comprising:
receiving an update to the table-level auto_purge value for a particular table of the plurality of tables; and
setting a table-level auto_purge value to an updated table-level auto_purge value only for the particular table of the plurality of tables.

7. The computer-implemented method of claim 1, further comprising:
receiving an update to the database-level auto_purge value; and
setting the table-level auto_purge values to an updated table-level auto_purge value for the plurality of tables based on receiving the update to the database-level auto_purge value.

8. The computer-implemented method of claim 1, wherein the steps of claim 1 are performed by and integrated within a database application that hosts the database.

9. The computer-implemented method of claim 1, wherein a service provider at least one of creates, maintains, deploys and supports the computing device.

10. The computer-implemented method of claim 1, wherein steps of claim 1 are provided by a service provider on at least one from the group consisting of a subscription, advertising, and a fee basis.

11. The computer-implemented method of claim 1, wherein the computing device includes software provided as a service in a cloud environment.

12. The computer-implemented method of claim 1, further comprising deploying a system comprising a computer infrastructure configured to perform the steps of claim 1.

13. A computer program product comprising a computer readable storage medium having program instructions embodied therewith, the program instructions executable by a computing device to cause the computing device to:
receive a database-level auto purge value for a database having a plurality of tables;
authenticate a source from which the database-level auto purge value is received by implementing a Database Administration Authority (DBADM) database administrator authentication protocol, wherein the DBADM database administrator authentication protocol includes a default auto purge value;
set the database-level auto purge value as the default auto purge value in response to the database-level auto purge value being less than the default auto purge value;
set table-level auto purge values for the plurality of tables included in the database based on the database-level auto purge value;
automatically purge data in a table of the plurality of tables based on determining the data in the table has an age that is equal to or greater than a threshold time period included in the database-level auto purge value; and
add a column and a corresponding update_date value to each row in the plurality of tables based on the table-level auto purge values, wherein the default auto purge value indicates that the data remains in the plurality of tables for at least a default amount of time.

14. The computer program product of claim 13, wherein the automatically purging the data comprises:
determining respective ages of respective data records stored in the plurality of tables by comparing a current date with respective update_date values representing when the respective data records were last modified; and
purging the data records where the ages are equal to or greater than the table-level auto purge values.

15. The computer program product of claim 13, wherein the program instructions further cause the computing device to receive an instruction to turn on an auto purge feature for the database, wherein the automatically purging the data is based on receiving the instruction to turn on the auto purge feature.

16. The computer program product of claim 13, wherein the program instructions further cause the computing device to:
receive an instruction to create a new table in the database; and
automatically set the table-level auto_purge value for the new table to match the database-level auto_purge value.

17. A system comprising:
a CPU, a computer readable memory and a computer readable storage medium associated with a computing device;
program instructions to receive a database-level auto purge value for a database having a plurality of tables;
program instructions to authenticate a source from which the database-level auto purge value is received by implementing a Database Administration Authority (DBADM) database administrator authentication protocol, wherein the DBADM database administrator authentication protocol includes a default auto purge value;

program instructions to set the database-level auto purge value as the default auto purge value in response to the database-level auto purge value being less than the default auto purge value;

program instructions to set table-level auto purge values for the plurality of tables included in the database based on the database-level auto purge value;

program instructions to automatically purge data in a table of the plurality of tables based on determining the data in the table has an age that is equal to or greater than a threshold time period included in the database-level auto purge value; and program instructions to add a column and a corresponding update_date value to each row in the plurality of tables based on the table-level auto purge values, wherein:

the default auto purge value indicates that the data remains in the plurality of tables for at least a default amount of time, and the program instructions are stored on the computer readable storage medium for execution by the CPU via the computer readable memory.

18. The system of claim 17, further comprising program instructions to store and maintain respective auto_purge_date values for each data record identifying a date in which each data record will be purged, wherein the respective auto_purge_date values are based on the table-level auto_purge values and respective update_date values.

\* \* \* \* \*